United States Patent [19]

Kemper

[11] 4,296,647

[45] Oct. 27, 1981

[54] DIFFERENTIAL TRANSMISSION DRIVE UNIT

[75] Inventor: Yves J. Kemper, Birmingham, Mich.

[73] Assignee: Vadetec Corporation, Troy, Mich.

[21] Appl. No.: 43,686

[22] Filed: May 30, 1979

[51] Int. Cl.³ .............. F16H 37/06; F16H 15/16; F16H 37/08; F16H 15/50

[52] U.S. Cl. .............................. 74/690; 74/191; 74/710

[58] Field of Search ............ 74/190, 190.5, 191, 74/193, 196, 665 F, 665 GB, 665 GC, 796, 665 H, 230.17 D, 690, 691, 710

[56] References Cited

U.S. PATENT DOCUMENTS

| | | | |
|---|---|---|---|
| 1,431,649 | 10/1922 | Gillette | 74/191 |
| 2,209,497 | 7/1940 | Winges et al. | 74/796 |
| 2,403,627 | 7/1946 | Bade | 74/796 |
| 3,224,300 | 12/1965 | Chery | 74/796 |
| 3,261,229 | 7/1966 | Thomas et al. | 74/665 GB |
| 3,263,763 | 8/1966 | Adams, Jr. | 74/230.17 D X |
| 3,274,859 | 9/1966 | Alsch | 74/796 |
| 3,298,238 | 1/1967 | Lea | 74/191 |
| 3,670,595 | 6/1972 | Chery | 74/796 X |
| 3,677,109 | 7/1972 | Stvemky | 74/796 |
| 4,098,145 | 7/1978 | Dickinson | 74/191 X |
| 4,152,946 | 5/1979 | Kemper | 74/193 |
| 4,208,926 | 6/1980 | Hanson | 74/190 X |
| 4,233,859 | 11/1980 | Kemper | 74/690 |
| 4,238,976 | 12/1980 | Kemper | 74/690 X |
| 4,267,749 | 5/1981 | Chambers et al. | 74/690 |

FOREIGN PATENT DOCUMENTS 839844  6/1960  United Kingdom ............ 74/191

Primary Examiner—C. J. Husar
Assistant Examiner—Moshe I. Cohen
Attorney, Agent, or Firm—Robert F. Ziems

[57] ABSTRACT

A power splitting differential transmission unit by which input power is transmitted in a controlled manner to one or both of two differential output shafts at continuously variable output/input speed ratios. The unit includes an integrated pair of continuously variable transmission units by which the output/input speed ratio for each output shaft may be adjusted synchronously for driving both output shafts at equal speeds within the speed ratio range of the unit, for varying the output/input speed ratio for each output shaft independently or for simultaneously increasing the output/input speed ratio with respect to one output shaft while decreasing the same ratio with respect to the other of the two shafts.

18 Claims, 6 Drawing Figures

DIFFERENTIAL TRANSMISSION DRIVE UNIT

BACKGROUND OF THE INVENTION

This invention relates to differential transmission drives and, more particularly, it concerns a differential drive unit construction by which power supplied at a single driving shaft is transmitted to each of an aligned pair of driven or output shafts at independent and continuously variable speed ratios.

In U.S. Pat. No. 4,152,946, issued May 8, 1979, in the name of the present inventor, several embodiments of continuously variable transmissions (CVT) are disclosed in which three frame supported working bodies operate to transmit a mechanical power input to a rotatable output at continuously variable speed ratios within the design range of the transmission. For purposes of definition in this background discussion as well as in the ensuing detailed description of the present invention and in the appended claims, the three working bodies may be termed, respectively, an "alpha body" which is supported by the transmission frame to be concentric with a first axis, a "beta body" which is concentric with a second axis inclined with respect to and intersecting the first axis at a point of axes intersection, and an "omega body" carried by or forming part of the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

It is to be noted that the terms "alpha body," "beta body" and "omega body" are completely arbitrary and as such, do not restrict the components designated thereby either to the class of transmission represented by the disclosure of the aforementioned patent or to specific structure to be described hereinafter. The terms will, however, lend consistency of definition in the description to follow and facilitate an understanding of various speed relationships to be expressed by algebraic equations.

The infinitely or continuously variable speed ratio capability of such transmissions is achieved by providing one of the beta and omega bodies with a pair of rolling or traction surfaces which are surfaces of revolution about the concentric body axis and which are of variable radii along that axis in symmetry with the point of first and second axes intersection. Physically, such rolling surfaces will thus provide the one body with a biconical-like configuration. The other of the beta and omega bodies is provided with a pair of rolling or traction surfaces which are also surfaces of revolution about the concentric body axis but which are of relatively constant radius. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\dot{\alpha}$) about the first axis, the rotational speed of the beta body about the second axis in a fixed frame of reference is ($\dot{\beta}$) and the rotational speed of the omega body on the first axis is ($\dot{\omega}$), then the respective speeds of the three bodies are related by the following equation:

$$\dot{\omega}-\dot{\alpha}+(\dot{\alpha}-\dot{\beta})R_b/R_w=0 \tag{1}$$

Because one of either the beta or the alpha bodies extends within the other of such bodies, the radius ratio $R_b/R_w$ may represent a value of either less than 1 (where $R_b$ is always less than $R_w$) or more than 1 (where $R_b$ is always greater than $R_w$). The function $\rho$ will be used hereinafter to designate either $R_b/R_w$ or the reciprocal $R_w/R_b$, whichever is greater than 1, it being understood that $\rho$ or its reciprocal $1/\rho$ are used appropriately.

A generally preferred mode of operating such transmissions has been to apply an input torque to the alpha body to carry the beta body in nutation and hold the omega body against rotation ($\dot{\omega}=0$). The beta body is linked with an output shaft rotatable on the first axis by gearing having a ratio factor (k) which theoretically may be of any value and also may be made either positive or negative depending on the particular gearing arrangement used. In light of the foregoing, where $\dot{\theta}$ is unit output speed and taking into account the gearing ratio (k), the output/input speed ratio of the unit is determined by an equation:

$$\dot{\theta}/\dot{\alpha}=1-k\rho. \tag{2}$$

A principal advantage of operating in the mode represented by equation (2) is that the physical parameters of such transmissions readily accommodate a range of values for the function ($k\rho$) which permit a continuously variable output/input speed ratio range of from zero to 1 ($1.0>k\rho>0.5$). Also, this range may be shifted to include an output reversal through zero merely by selecting a gear ratio (k) so that the function ($k\rho$) brackets a numerical value of 1 (e.g. $1.2>k\rho>0.7$).

In addition to the aforementioned patent, reference is also made to U.S. Pat. No. Re. 29,328, reissued Aug. 2, 1977 in the name of Yves Jean Kemper; U.S. Pat. No. 4,112,779 and U.S. Pat. No. 4,112,780, the latter both having issued on Sept. 12, 1978, in the name of Yves Jean Kemper and Lucien Bigot. These issued patents disclose additional variations of the continuously variable transmission type referred to above. As will be seen from these several prior patents, the particular configuration of any one of the alpha, beta and omega bodies as defined herein may vary in the respectively disclosed embodiments.

SUMMARY OF THE INVENTION

In accordance with the present invention, the basic structure and speed ratio varying characteristics of the previously disclosed, continuously variable transmission is adapted to a power splitting differential unit by which input power is transmitted in a controlled manner to one or both of two differential output shafts connectable, for example, to a pair of drive wheels or driving tracks on opposite sides of a steerable, self-propelled vehicle. As in prior transmission structures, a unit frame defines a first axis and supports an alpha body for rotation on that axis. In this instance, however, the alpha body carries on a second axis inclined with respect to and intersecting the first axis at a point of axes intersection, a pair of coaxial beta bodies which are independently rotatable on the second axis. Each beta body defines a beta traction surface of revolution about the second axis, which surface frictionally engages a single omega traction surface of revolution about the first axis. Where the latter surface is provided as an internal circular surface on one of two omega bodies or rings held against rotation on the first axis but shiftable along that axis, each beta surface is of external frusto-conical configuration. The two beta surfaces are oppositely convergent and are retained against the respective omega surfaces under normal force loading developed by a force generating means acting to separate the two beta bodies away from each other along the second axis. Each beta body is drivably connected by gearing to one of the two unit output shafts.

The ratio of input speed to output speed for each output shaft is continuously variable in accordance with equation (2), above, by axial shifting of each omega ring along the first axis to vary the radius ratio of beta/omega surface radii at the points of traction surface contact. This radius ratio at each point of contact is made independent from the radius ratio at the other of such points of contact by virtue of an omega ring adjusting system capable of operation to move the omega rings toward and away from each other at equal rates of movement and thus vary equally the ratio of beta/omega surface radii at the two contact points and/or move both omega rings in the same direction simultaneously to oppositely vary the respective ratios of beta/omega surface radii at the two contact points. Such as adjusting system is represented, for example, by an arrangement of oppositely pitched rotatable adjustment screws supported to be shiftable axially with respect to the unit frame. By simple rotation of the screws, the rings will be moved simultaneously toward and away from each other whereas axial adjustment of the screws would effect movement of both rings in the same direction or movement of only one ring where axial adjustment of the oppositely pitched screws is opposed equally by rotation of the same screws but on one side only.

A principal object of the present invention is, therefore, the provision of a continuously variable differential drive unit by which the speed ratio of a single power input relative to a pair of independently rotatable power output shafts may be precisely controlled continuously throughout a range of input/output speed ratios for each output shaft. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
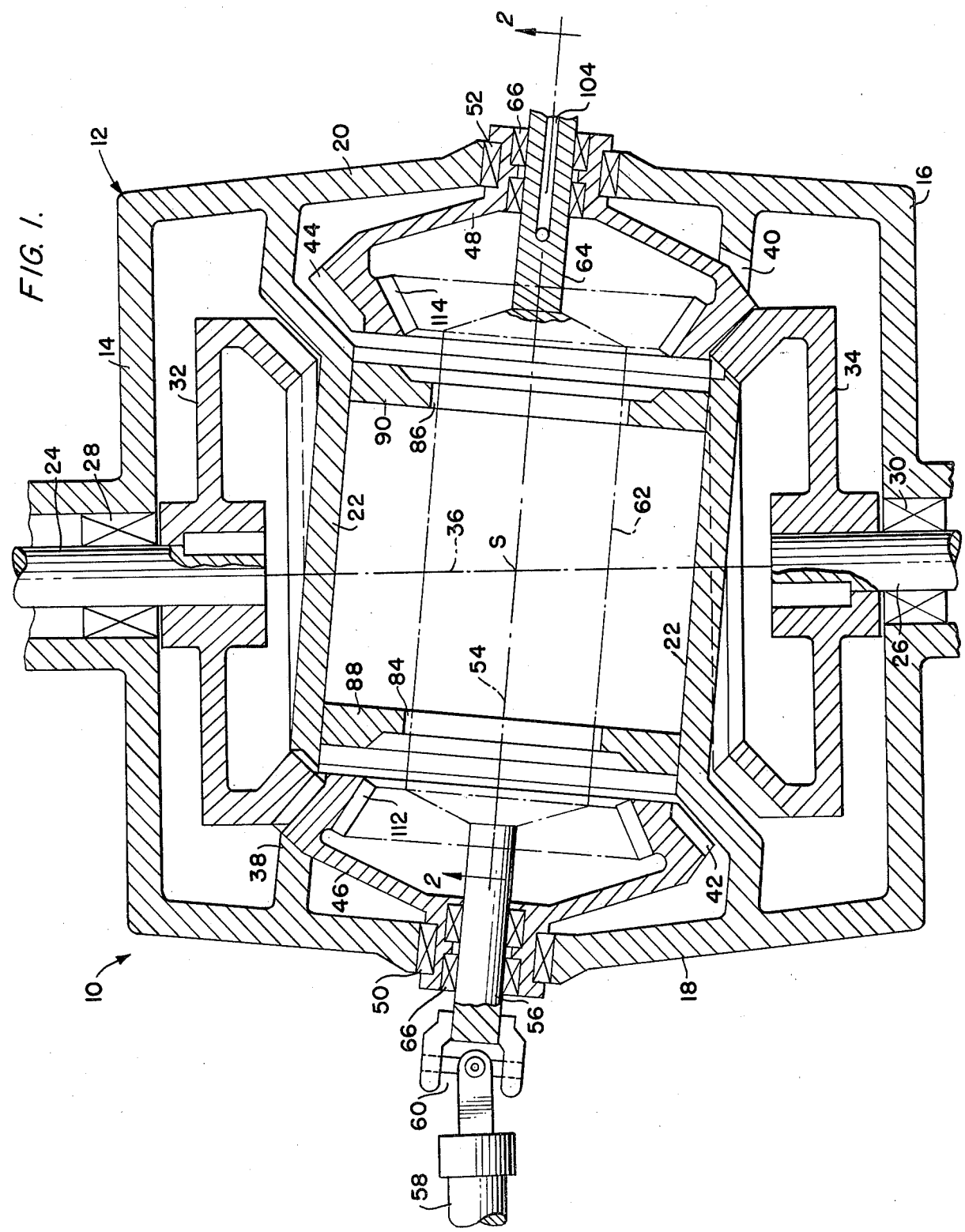
FIG. 1 is a longitudinal cross-section on a horizontal mid plane through a differential transmission drive unit representing one embodiment of the present invention.
Figure 2:
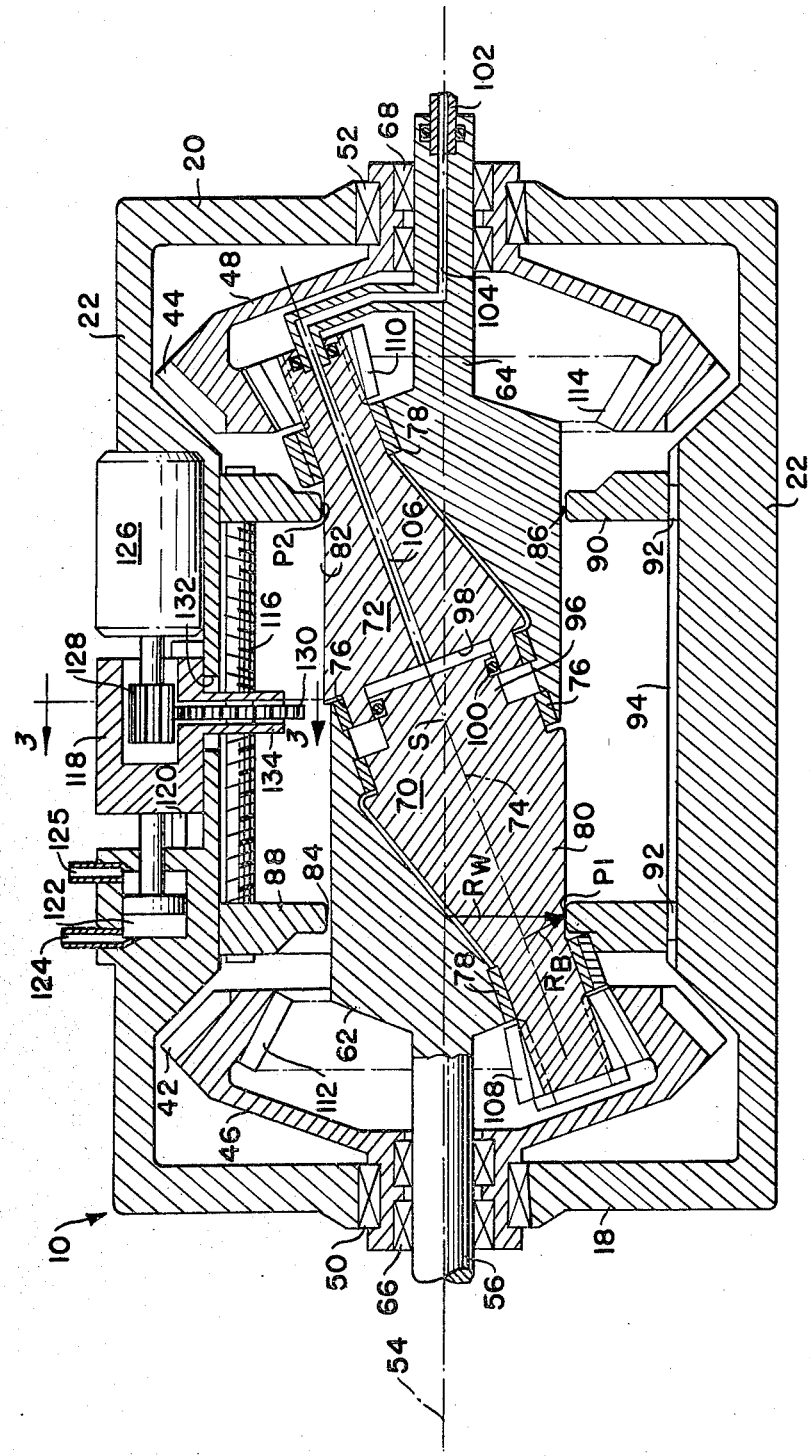
FIG. 2 is a cross-section on line 2—2 of FIG. 1.

In FIGS. 1 and 2 of the drawings, an embodiment of the differential transmission drive unit is generally designated by the reference numeral 10 and shown to include a casing or frame 12 having exterior sidewalls 14 and 16 joined by front and rear end walls 18 and 20, respectively. A generally cylindrical interior frame structure 22 extends between and is fixed with respect to the end walls 18 and 20 of the casing 12.

A pair of output shafts 24 and 26 extend from opposite sides of the casing 12 and are rotatably supported at least in part from the casing by bearings 28 and 30, respectively. Each of the shafts extends within the casing 12 between the end walls 14, 16 and the frame 22 and are keyed to driven bevel gears 32 and 34, respectively. As shown in FIG. 1, the output shafts 24 and 26 are coaxial and as such lie on a common axis 36. Each of the gears 32 and 34 projects on one side only through an opening 38, 40 to mesh with external teeth 42, 44 on a pair of ring gears 46 and 48, respectively. The ring gears 46 and 48 are journalled in the end walls 18, 20 of the casing 12 by bearings 50 and 52 to be coaxial with respect to one another and to be concentric with a first CVT axis 54. Also concentric with the axis 54 is a unit input shaft 56 connected to a power shaft 58 by universal or U-joint 60. Although the illustration in FIG. 1 is incomplete with respect to internal components by which power is transmitted from the input shaft 56 to the respective output shafts 24 and 26, such internal components are completely in FIGS. 2–4 of the drawings and will be described in detail below with reference to these drawing figures.

In FIG. 2, the input shaft 56 is shown to be an integral stub shaft extension at one end of a crank-like alpha body 62 having a stub shaft extension 64 also at its opposite end. By virtue of the stub shafts 56 and 64 being carried by bearings 66 and 68, it will be appreciated that the alpha body 62 is rotatable with respect to the frame 22 and the ring gears 46, 48 as well as being rotatable on the first CVT axis 54.

The alpha body 62 supports a pair of independently rotatable beta bodies 70 and 72 in coaxial alignment with and rotatable on a second CVT axis 74 inclined with respect to and intersecting the first CVT axis 54 at a point S of axes intersection. Each of the beta bodies 70 and 72 is journalled in the alpha body by inner and outer bearings 76 and 78 which may be of any suitable type such as hydrodynamic bearings, roller bearings, or the like but which do not restrict slight axial movement of the bodies 70 and 72 along the axis 74.

The beta bodies 70 and 72 each define an exterior frusto-conical, rolling or traction surface of revolution 80, 82 about the second CVT axis 74. The beta surfaces 80 and 82 are thus oppositely convergent at an angle approximating twice the angle at which the axes 54 and 74 intersect. The beta surfaces 80 and 82, moreover, are in rolling frictional engagement at diametrically opposite points P1 and P2 with omega traction or rolling surfaces 84 and 86. The latter surfaces are internal circular surfaces formed on a pair of omega bodies 88 and 90 constituted as rings secured against rotation about the first axis 54 such as by lugs 92 in frame defined slots 94. The surfaces 84 and 86 are thus surfaces of revolution about the first axis 54 at a constant radius $R_w$ and are movable along the axis 54 from the outermost position illustrated in FIG. 2 inwardly to a position in which they are close to the point S of axes intersection. The conical surfaces 80 and 82 on the beta bodies 70 and 72, on the other hand, are of a variable radius $R_b$ depending on the location of the contact points P1 and P2 in turn determined by the axial position of the omega rings 88 and 90.

To retain the respective beta and omega surfaces in torque transmitting rolling friction engagement with each other, the beta bodies 70 and 72 are formed, respectively, with a concentric piston 96 and cylinder 98 closed by a slidable and rotatable seal represented in FIG. 2 by an O-ring 100. Hydraulic fluid from an external source 102, fed under pressure through porting 104 in the alpha body 62 and a central passage 106 in the beta body 72, will operate to forceably separate the beta bodies 70 and 72 and urge them into rolling friction engagement with the omega rings 88 and 90. It is to be understood that the hydraulic system thus illustrated and described is exemplary of acceptable means by which the beta bodies 70 and 72 may be forceably separated from each other along the axis 74 into engagement with the omega surfaces 84 and 86 while at the same time, permit relative rotation of the bodies 70 and 72.

Each of the beta bodies 70 and 72 carries at its outer end a pinion gear 108, 110 to mesh with internal teeth 112, 114 on the ring gears 46 and 48, respectively. A gear ratio factor k, determined by dividing the diameter of each pinion gear 108, 110 by the diameter of the internal teeth 112, 114 is the same for each gear set 108, 112 and 110, 114, respectively.

The transmission of power from the input shaft 56 to the respective output shafts 24 and 26 may now be understood from the preceeding description of components illustrated in FIGS. 1 and 2 of the drawings. In particular, power at the input shaft 56 will drive the alpha body 62 in rotation about the first CVT axis 54 to carry both beta bodies 70 and 72 as well as the second CVT axis 74 in nutation about the first axis 54. A combination of orbital movement of each pinion gear 108 and 110 and rotation of each of these pinion gears on the second axis 74, as a result of rolling frictional engagement of the beta surfaces 80 and 82 with the omega surfaces 84 and 86, will drive each of the rings 46 and 48 about the axis 54. Rotation of the ring gears 46 and 48, in turn, will cause rotation of the bevel gears 32 and 34 and thus drive the output shafts 24 and 26, respectively.

As mentioned, the gear ratio factor k is the same for each beta body 70 and 72 and in a given design will be fixed or constant. The radius ratio $R_w/R_b$ or the factor $\rho$ for each beta/omega surface contact point P1 or P2 is variable. Specifically, if the rotational velocity of each ring gear 46 and 48 is $\dot{\theta}$ and the rotational velocity of the input shaft 56 is $\dot{\alpha}$, the output/input speed ratio, or the speed of the ring gears relative to the speed of the input shaft 56 may be determined by equation (2) above.

Figure 3:
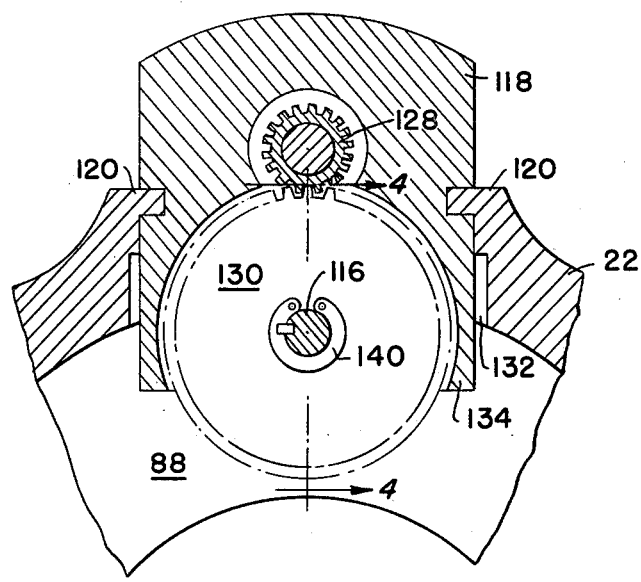
FIG. 3 is an enlarged fragmentary cross-section on line 3—3 of FIG. 2.
Figure 4:
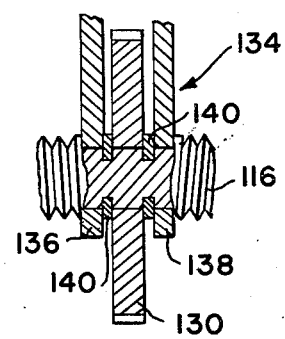
FIG. 4 is a fragmentary cross-section on line 4—4 of FIG. 3.

As mentioned, the radius ratio $\rho$ at each beta/omega surface contact point P1 or P2 will be determined by the axial position of each omega ring 88 and 90. In accordance with the present invention, the ratio of beta/omega surface radii or the function $\rho$ at each contact point P1 and P2 is independently adjustable by an omega ring adjusting system capable of moving both rings 88 and 90 toward and away from each other at equal rates so that the radius ratio at each contact point will be equal, or capable of moving both rings concurrently in the same direction so that the radius ratio at one of the two contact points is increased while the radius at the other of the two contact points is decreased. Such as adjustment system is illustrated in FIGS. 2-4 of the drawings to include an oppositely pitched, rotatable adjustment screw 116 threadably engaged with each ring 88 and 90 and axially secured centrally to a carriage 118. As shown in FIGS. 2 and 3, the carriage 118 is mounted in the frame 22 to be slidable in a direction parallel to the axis 54 by guideways 120. Such axial movement of the carriage 118 is effected by a hydraulic piston cylinder unit 122 controlled by passage of hydraulic fluid through conduits 124 and 125 in a well known manner. Rotatable adjustment of the screw 116 is effected by an electric motor 126 fixedly mounted to the exterior of the frame 22 and having an output gear 128 in mesh with a relatively large-diameter, driven gear 130 keyed to the oppositely pitched screw 116. The motor drive gear 128 is elongated to accommodate movement of the gear 130 with the carriage 118. As shown in FIGS. 1 and 3, the frame 22 is provided with an opening 132 to accommodate a depending bracket portion 134 of the carriage 118. As shown in FIGS. 2 and 4, the gear 130 is journalled between opposite walls 136 and 138 of the depending bracket portion 134. Relative axial movement of the screw 116 and the carriage is prevented by snap rings 140 situated between the gear 130 and the walls 136 and 138.

The omega ring adjustment system thus illustrated in FIGS. 3-4 is intended to exemplify but one acceptable form of other contemplated variations. For example, the use of one double pitched adjustment screw 116 will suffice to axially position the omega rings 88 and 90 due to the fact that the adjustment forces required to move the rings is relatively small when the beta bodies 70 and 72 are in motion. It is contemplated, however, that two or three such adjustment screws 116 may be provided and each associated with the same or synchronously moved carriages 118. Also, each one of two or more adjustment screws may be driven by separate electrically synchronized stepping motors or a single motor may be drivingly connected with each of the plurality of adjustment screws 116 be external shafting (not shown).

If it is assumed that each of the output shafts 24 and 26 are coupled to drive wheels on opposite sides of an automotive vehicle, for example, and that the power shaft 58 is connected directly with the engine of such a vehicle, operation to vary the speed ratio of both output shafts 24 and 26 equally relative to the input shaft 56 may parallel conventional automotive transmission by adjustment of the carriage 118 to center the screw 116 in a plane intersecting the point S of axes intersection and adjusting both rings 88 and 90 toward and away from each other by simple rotation of the screw 116. In this manner, both output shafts 24 and 26 will be driven at the same speed but which is variable continuously from an output/input ratio of zero (consider equation (2) and the discussion of the parameters k and $\rho$, above) to an output/input ratio which may approach 1/1 or unity depending on the range of radius ratios $\rho$ in a given design of the unit 10. When the vehicle negotiates a curve, calling for one of the shafts 24 or 26 to be driven at a greater speed than the other, the carriage 118 is shifted axially, with or without rotation of the screw 116 to vary the speed at which the respective shafts 24 and 26 are driven for a given rotational velocity of the input shaft 56.

The unit 10 also has application in tracked vehicles or vehicles which are steered by varying the speed at which ground engaging tracks or wheels on opposite sides of the vehicle are driven at different speeds or in opposite directions. As pointed out previously, by appropriate selection of the parameters k and $\rho$, the rings 88 and 90 may be adjusted so that the shafts 24 and 26 will be rotated in opposite directions for a given direction of rotation in the input shaft 56. Thus, by adjustment of both rings 88 and 90 to an axial position at which rotation of the ring gears 46 and 48 approaches zero, one of the ring gears 46 and 48 and thus one of the shafts 24 and 26 may be driven in one direction whereas the other of the ring gears and output shafts 24 and 26 is driven in the opposite direction by actuation of the carriage 118 to shift both rings 88 and 90 in the same direction. The same mode of adjustment may be effected at relatively high output/input speed ratios in automotive vehicles, for example, to provide a power steering assist. In other words, any manually-initiated vehicle steering may be assisted by adjusting the carriage 118 to cause the driving wheels on opposite sides of the vehicles to be driven at speeds consistent with a power steering assist. A power steering assist of this type is particularly applicable to front wheel drive vehicles.

Figure 5:
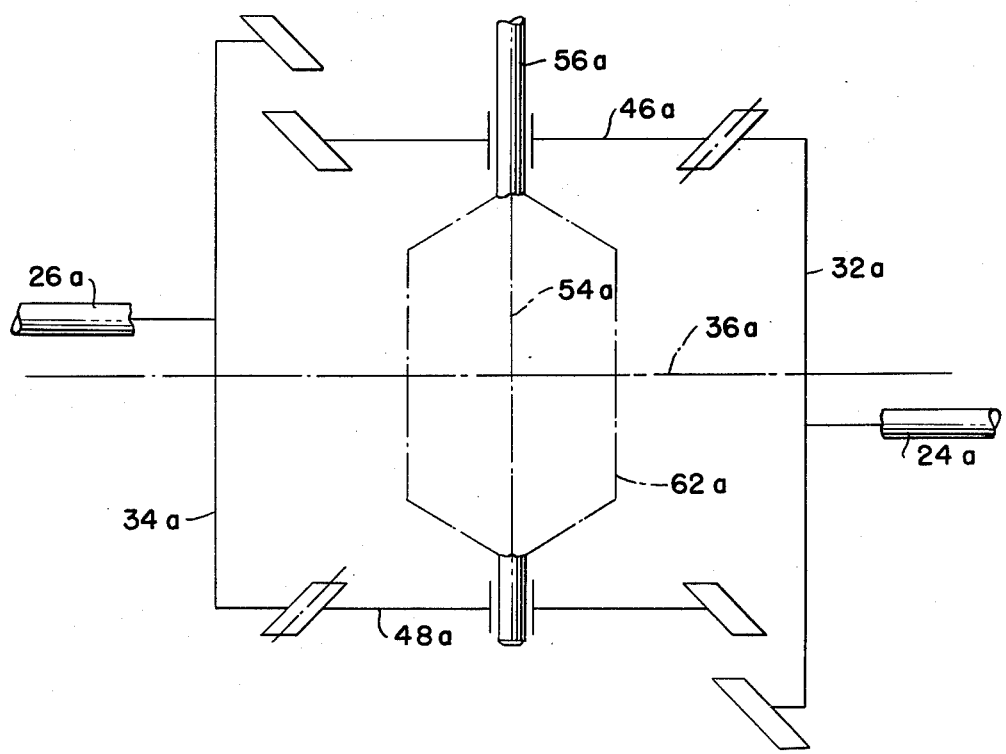
FIG. 5 is a schematic view illustrating the arrangement of a variation of the embodiment of FIGS. 1 and 2.

As may be appreciated from FIG. 1 of the drawings, the primary CVT axis 54 is skewed to be at an angle with respect to the axis 36 of the output shafts 24 and 26. Also it will be noted that the axis 36 passes through the point S of CVT axes intersection. The reason for the skewed relationship of the axes 54 and 36 is to enable the driven bevel gear 32 to mesh directly with the external teeth 42 and 44 on the ring gears 46 and 48. Also this arrangement is necessary to locate both output shafts 24 and 26 on the same axis or the axis 36, assuming a direct meshing of the gears as shown. In FIG. 5, a variation is shown schematically in which a pair of output shafts 24a and 26a extend on offset axes parallel to an axis 36a which, in turn, is perpendicular to the axis 54a. The driven bevel gears 32a and 34a are of a diameter sufficiently large to mesh with only one of the ring gears 46a or 48a without interferring with the other of these such rings gears. As will be appreciated by those skilled in the art, gearing geometry other than that represented by FIGS. 1 and 5, for example, may be provided to achieve desired gear reduction factors between the rings 46 and 48 and the output shafts 24 and 26.

Figure 6:
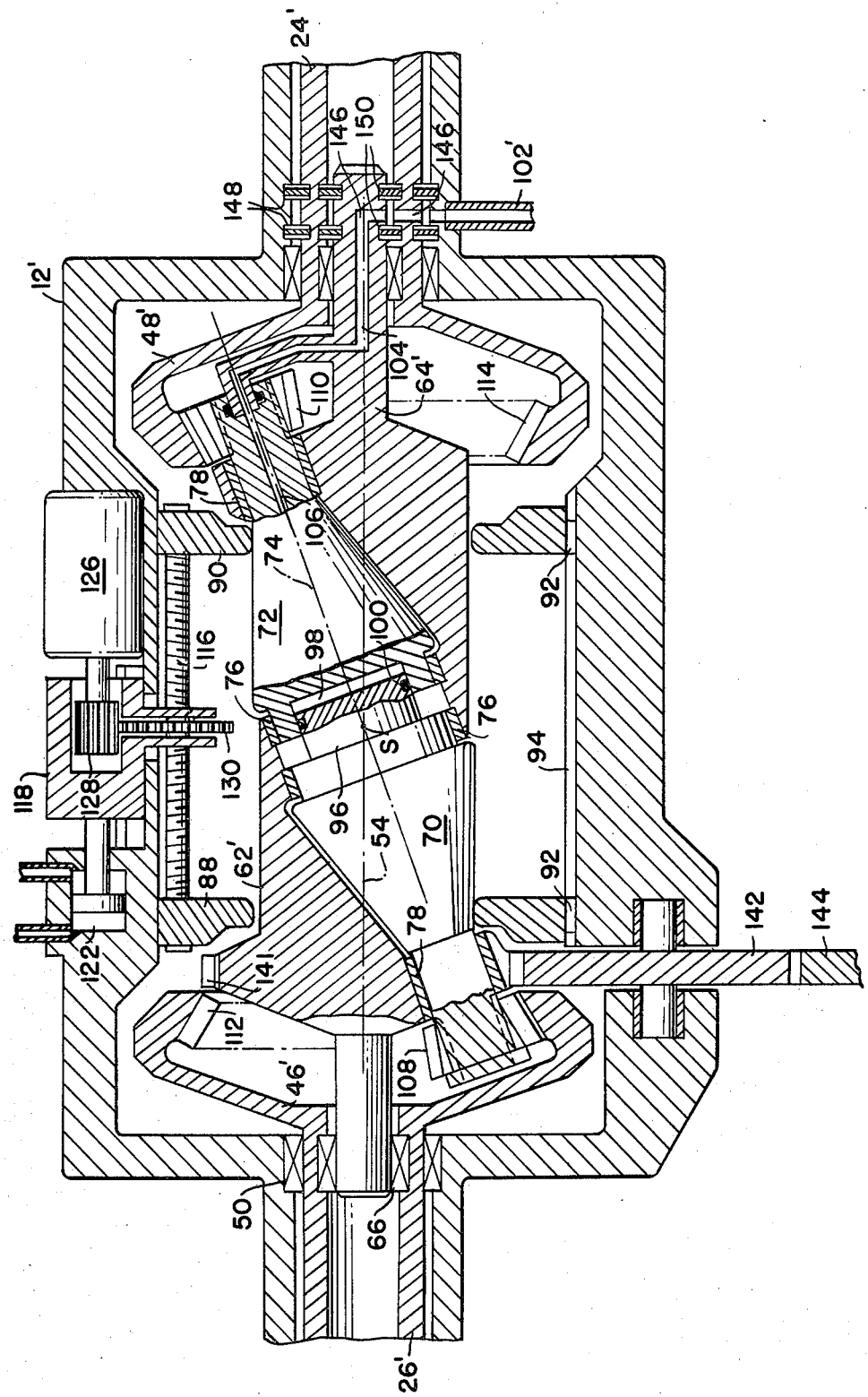
FIG. 6 is a cross-section similar to FIG. 2 but illustrating an alternative embodiment of the invention.

In FIG. 6, an alternative embodiment of the differential transmission unit of the present invention is illustrated and in which parts identical to parts identified with respect to FIG. 2 are designated by the same reference numeral whereas parts which are modified structurally but serve the same or equivalent function are designated by the same reference numerals primed. Thus in FIG. 6, the beta bodies 70 and 72, the omega rings 88 and 90 as well as the adjustment system for the omega rings remains unchanged. In this embodiment, however, the alpha body 62' is modified to include a driven gear 141 in mesh with an idler gear 142 journalled in the casing 12' and adapted to be driven by a driving gear 144. The driving gear 144, in turn, may be coupled to a power source (not shown) but which may include, for example, an internal combustion engine oriented in parallel with the axis 54. As will be appreciated by those familiar with the automotive art, such an arrangement is particularly suited for accommodating front wheel drive vehicles.

In the embodiment of FIG. 6, the output shafts 24' and 26' are connected directly to the ring gears 46' and 48' which, in this instance, include only the internal teeth 112 and 114 to mesh with the pinion gears 108 and 110, respectively. Also in this embodiment it will be noted that the passageway for hydraulic fluid from the external source 104' to the cylinder 98 is through radial porting 146 in the output shaft 24' and the alpha body stub shaft 64. Axially spaced and rotatable seal sets 148 and 150 between the casing and the output shaft 24' on the one hand, and the output shaft 24' and the stub shaft 64 on the other hand, contribute to the provision of a fluid passageway by which hydraulic fluid under pressure at the source 102' may control the force by which the beta bodies 70 and 72 are forceably separated to engage the omega rings 88 and 90.

The operation of the embodiment of FIG. 6 is essentially similar to the described operation of the embodiment of FIGS. 1 and 2. The principal difference resides in the direct connection of the output shafts 24' and 26' to the ring gears 46' and 48' in the embodiment of FIG. 6 as compared with the output shaft bevel gearing of the embodiment of FIGS. 1 and 2.

In light of the foregoing description, it will be appreciated that as a result of the present invention, there is provided a highly effective differential transmission unit by which the objectives of the invention are fulfilled. It will be equally apparent that variations may be made in the disclosed embodiments without departure from the present invention. Accordingly, it is expressly intended that the foregoing description and accompanying drawing illustrations are representative of preferred embodiments only, not limiting, and that the true spirit and scope of the present invention be determined by reference to the appended claims.

I claim:

1. A differential transmission unit for transmitting a mechanical power input to a pair of independently rotatable outputs, said unit comprising:

a unit frame defining a first axis;

an alpha body supported by said frame for rotation on said first axis;

a pair of beta bodies carried by said alpha body on a second axis inclined with respect to and intersecting said first axis at a point of axes intersection, said beta bodies being axially spaced to be positioned on opposite sides of said point of axes intersection and each having a beta rolling surface of revolution about said second axis;

a pair of omega bodies supported by said frame and each having an omega rolling surface of revolution about said first axis, said omega rolling surfaces being positioned on opposite sides of said point of axes intersection;

said beta and omega rolling surfaces being in frictional engagement at two contact points located one on each side of said point of axes intersection thereby to establish one such contact point between each beta and omega body of said pairs and whereby nutational movement of said beta body pair results in torque transmission between said beta and omega rolling surfaces, at least one of said beta and omega rolling surfaces having variable radii along the length thereof relative to the other of said beta and omega surfaces so that the ratio of beta/omega surface radii at said contact points is varied by relative shifting of said beta and omega bodies;

means for drivably connecting the power input and said alpha body;

a pair of rotatable unit output shafts;

means for supporting the respective bodies of one pair of said beta and omega bodies for independent rotation;

means drivably connecting said one pair of said beta and omega bodies to said pair of output shafts;

means holding the other of said beta and omega body pairs against rotation on the rolling surface axis thereof; and means for relative shifting of said beta and omega bodies in frictional engagement at each of said two contact points to vary the ratio of beta/omega surface radii independently at said respective contact points.

2. The apparatus recited in claim 1, wherein said means for drivably connecting the power input and said alpha body comprises a stub shaft concentric with said first axis.

3. The apparatus recited in claim 1, wherein said means for drivably connecting the power input and said alpha body comprises a driven gear carried by said alpha body and concentric with said first axis, and a driving gear connecting said power input and said alpha body carried driven gear.

4. The apparatus recited in claim 1, wherein said omega surfaces are internal circular surfaces, wherein said beta surfaces are oppositely convergent frusto-conical surfaces, and including means for forceably separating said beta bodies along said second axis to develop a normal force at each of said contact points.

5. The apparatus recited in claim 4, wherein said means holding the other of said body pairs against rotation comprises means rotatably coupling said omega bodies and said frame and wherein said means for relative shifting of said bodies comprises means for adjusting the position of said omega bodies along said first axis.

6. The apparatus recited in claim 5, wherein said means for adjusting said omega bodies along said first axis comprises means for adjusting said omega bodies toward and away from each other at equal rates of adjustment thereby to vary equally the ratio of the beta/omega surface radii at said two contact points, and for adjusting said omega bodies in the same direction simultaneously, thereby to vary oppositely the ratio of beta/omega surface radii at said respective contact points.

7. The apparatus recited in claim 6, including independent first and second drive means for adjusting said omega bodies toward and away from each other and for adjusting said omega bodies in the same direction, respectively.

8. The apparatus recited in claim 7, wherein said first and second drive means are operative concurrently.

9. The apparatus recited in claim 8, wherein said first drive means comprises at least one oppositely pitched threaded screw extending between and threadably engaging said omega bodies and means for rotating said screw in opposite directions of rotation.

10. The apparatus recited in claim 9, wherein said second drive means comprises means for moving said oppositely pitched screw axially in opposite directions.

11. The apparatus recited in either of claims 5, 6 or 7, wherein said means for drivably connecting one of said beta and omega body pairs to said pair of output shafts comprises gear means for converting movement of each of said pair of beta bodies to rotation of each of said pair of output shafts, respectively.

12. The apparatus recited in claim 11, wherein said gear means associated with each of said beta bodies comprises a driving pinion gear carried by said beta body in orbital movement by nutation of said second axis about said first axis and for rotation with said beta body on said second axis, and a driven gear in mesh with said pinion gear and rotatable on said first axis.

13. The apparatus recited in claim 12, wherein the diametric ratio ($k$) of said pinion gear to said ring gear and the radius ratio ($\rho$) of said omega rolling surfaces to said beta rolling surfaces are related to provide an output/input speed ratio extending to zero for each of said output shafts.

14. The apparatus recited in claim 13, wherein said diametric ratio ($k$) is of a numerical value equal to the reciprocal of at least one numerical value of the radius ratio ($\rho$).

15. The apparatus recited in claim 12, wherein said driven gear comprises a ring gear having internal teeth in mesh with said pinion gear.

16. The apparatus recited in claim 15, wherein said ring gear includes external bevel teeth and wherein said gear means further comprises a driven bevel gear coupled to each of said output shafts and in meshing engagement with said external teeth on each of said ring gears, respectively.

17. The apparatus recited in claim 16, wherein said output shafts are aligned on a third axis intersecting said point of axes intersection and skewed with respect to said first axis.

18. The apparatus recited in claim 16, wherein said output shafts are parallel to and oppositely offset from a third axis perpendicular to said first axis.

* * * * *